United States Patent
Brown, II

[15] 3,668,954
[45] June 13, 1972

[54] FORM TOOL HOLDER

[72] Inventor: Robert S. Brown, II, Grass Lake, Mich.
[73] Assignee: Federal Screw Works, Detroit, Mich.
[22] Filed: May 19, 1970
[21] Appl. No.: 38,759

[52] U.S. Cl. .................................................. 82/36, 82/37
[51] Int. Cl. .......................................................... B23b 29/10
[58] Field of Search ................................................ 82/36, 35

[56] References Cited

UNITED STATES PATENTS

| | | | |
|---|---|---|---|
| 3,142,215 | 7/1964 | Mancuso | 82/36 |
| 3,141,366 | 7/1964 | Frank | 82/36 |
| 2,540,568 | 2/1951 | Clatfelter | 82/36 |

Primary Examiner—Leonidas Vlachos
Attorney—Harness, Dickey & Pierce

[57] ABSTRACT

A form tool holder adapted to be mounted on the slide of an automatic screw machine. The tool holder has a base provided with a guide opening in which the shank of a tool carrier is slidably fitted. The base is slotted along one side of the guide opening to define a deflectable base wall which can be clamped against the carrier shank to lock the carrier in any desired position. The base has a key on its lower surface which is adjustable about a pivot axis to facilitate squaring of the base to a keyway on the slide. The carrier is reversible in the base guideway for either upcutting or downcutting and it can be set for either right hand, left hand or zero tool relief.

7 Claims, 6 Drawing Figures

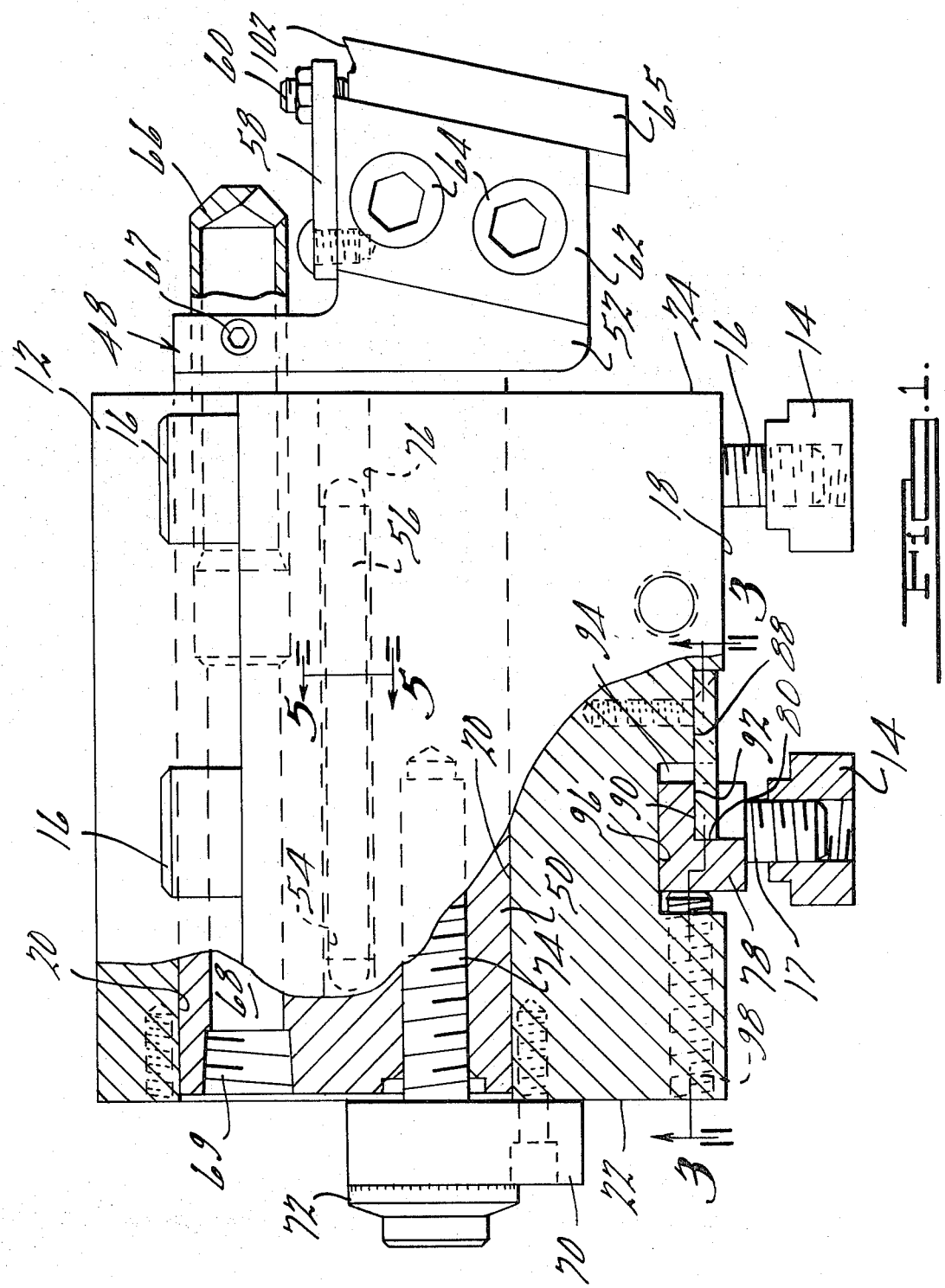

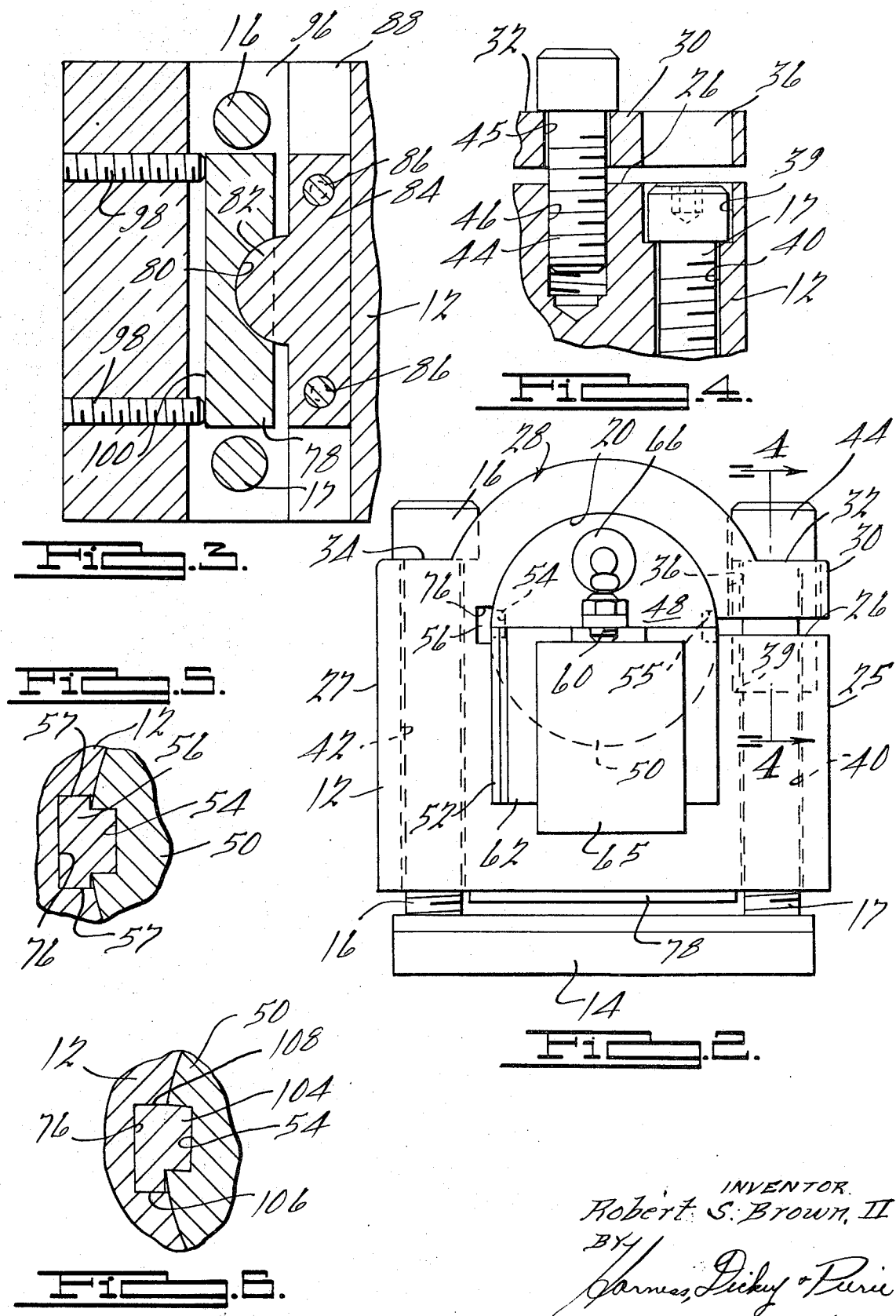

3,668,954

FORM TOOL HOLDER

SUMMARY OF THE INVENTION

The form tool holders in common use on automatic screw machines are of a type requiring a relatively skilled machinist to install and set up the tool holder on the machine. Furthermore, the readjustment of the usual tool holder to compensate for the grinding of the tool, for example, also requires the skills of an experienced workman. The tool holder of the present invention is designed to permit original installation and readjustment of the tool in a highly precise and convenient manner by workmen of limited experience and skills.

It is an object of the present invention to provide a form tool holder which is highly versatile in use, which may be set for either upcutting or downcutting, and which may be set to provide either right hand, left hand relief or zero tool relief.

It is another object of the present invention to provide a form tool holder in which the squareness of the tool cutting edge to the work may be set with great precision by the mere rotation of a pair of set screws, thereby simplifying the removal of "taper."

It is still a further object of the present invention to provide a form tool holder in which the axial position of the tool may be adjusted without disturbing the transverse position or squareness of the tool holder on the slide.

It is a further object of the present invention to provide a form tool holder which is highly accurate in nature, is rugged in design, is compact in size, possesses a minimum number of parts for the adjustability incorporated therein, is relatively inexpensive to manufacture and is reliable in performance.

DESCRIPTION OF THE VIEWS OF THE DRAWINGS

FIG. 1 is a view partly in section and partly in elevation of a form tool holder constructed in accordance with the principles of the present invention;

FIG. 2 is a front elevational view of the structure illustrated in FIG. 1;

FIG. 3 is a sectional view of the structure illustrated in FIG. 1 taken along the line 3—3 thereof;

FIG. 4 is a sectional view of the structure illustrated in FIG. 2 taken along the line 4—4 thereof;

FIG. 5 is a sectional view of the structure illustrated in FIG. 1 taken along the line 5—5 thereof; and FIG. 6 is a view of structure similarly illustrated in FIG. 5 showing the use of another key.

DETAILED DESCRIPTION OF THE PREFERRED EMBODIMENT

Referring now to FIGS. 1 and 2 the tool holder of the present invention will be seen to include a cast metallic base 12 which is adapted to be positioned on the slide (not shown) of an automatic screw machine. For this purpose a pair of elongated T-nuts 14 are used, each having a pair of tapped holes. A pair of bolts 16 are threaded into the nuts 14 on one side of the base 12 and a pair of bolts 17 are threaded into the nuts 14 on the other side of the base 12. The base 12 also has a flat bottom surface 18 which rests on the machine side. For the purposes of description it will be assumed that the base 12 is positioned with its bottom surface 18 in a downwardly facing horizontal attitude. It will be appreciated, however, that the tool holder will assume various attitudes depending upon the particular machine with which it is used and the particular slide on which it is mounted. A large cylindrical guide opening or bore 20 extends from a flat rear surface 22 of the base to a base front surface 24. A slot 26 extends from the guide opening 20 to a side wall 25 on one side of the base 12. A side wall 27 is located on the opposite of the base 12. The slot 26 extends the entire length of the base 12 from the rear wall 22 to the front wall 24. The formation of the slot 26 forms a deflectable wall 28 at the upper portion of the base 12. The deflectable wall 28 is of generally arcuate cross-sectional shape but has a flat lip 30 along its free edge. The lip 30 has a shoulder 32 on the upper surface thereof which is coplanar with a shoulder 34 formed on the upper surface of the base 12 adjacent the side wall 27.

The lip 30 is formed with two openings 36 extending vertically therethrough and of a size sufficient to permit the heads of the bolts 17 to pass therethrough. The heads of the bolts 17 seat within counterbores 39 of holes 40 which extend downwardly in the base 12 from the slot 26 through the bottom surface 18. On the opposite side of the deflectable wall 28 it will be seen that the heads of the bolts 16 seat on the shoulder 34, the bolts 16 passing freely through vertical holes 42 extending from the shoulder 34 through the bottom surface 18 of the base 12. One bolt 16 and one bolt 17 are threaded into each of the T-nuts 14. From the foregoing it will be apparent that the seating of the bolts 17 is such as to avoid interference with the movement of the deflectable wall 28.

It will be seen that the inner diameter of the deflectable wall 28 forms a portion of the guide opening 20. The deflectable wall 28 can be drawn inwardly to clamp anything positioned in the guide opening 20 by means of a pair of clamping screws 44 which pass freely through openings 45 formed in the lip 30 and are threaded into tapped bores 46 extending downwardly into the base 12 from the slot 26.

A carrier or tool support member 48 is provided with a cylindrical shank 50 positioned within the guide opening 20. The carrier 48 has a head 52 formed on the front end thereof and a pair of diametrically opposite key slots 54 and 55 positioned generally centrally of the shank 50. The key slots 54 and 55 extend longitudinally of the shank 50 and a key 56 is positioned in one of said slots. A bracket 58 is fixed to the carrier head 52 and serves to support an adjustable stop member 60. A dovetail clamp 62 is fastened to the head 52 by means of screws 64 and clamps a form cutting tool 65 to the head. A coolant nozzle projects from the shank 50 above the head 52 and functions to direct coolant down onto the tool 65. The position of the nozzle is adjustable and may be fixed by means of a set screw 67. The nozzle 66 receives coolant from an elongated coolant passage 68 which extends longitudinally of the shank 50 and is adapted to be connected to a coolant hose (not shown) at an inlet opening 69.

A bracket 70 is fixed to the rear surface 22 of the base 12 and engages the head 72 of a micrometer adjusting screw 74. The relationship of the bracket 70 to the head 72 is such as to permit rotation of the adjusting screw 74 but prevent longitudinal movement of the adjusting screw 74. The shank 50 is prohibited from rotating by the engagement of the key 56 in a keyway 76 extending axially along one side of the guide bore opening 20. The key 56 has a pair of parallel walls 57 which are slidably engaged by the opposite sides of the keyway 76 and keep the key slots 54 and 55 radially aligned therewith. The longitudinal position of the carrier 48 is adjusted by rotating the micrometer adjusting screw 74 and thereafter tightening the screws 44 to cause the deflectable wall 28 to clamp the carrier shank 50 in the selected position.

The position of the base 12 on a machine tool slide is controlled, in part, by a key 78 which projects from the bottom surface 18. The key 78 fits within a transverse keyway (not shown) of the machine slide above one of the T-nuts 14 and between one of the bolts 16 and one of the bolts 17. If the key 78 is absolutely square to the guide opening 28, the base will be squarely positioned on the machine slide. The means by which the key 78 is held to the base 12 permits the squaring of the key on the base. The key 78 is formed with a segmentally cylindrical recess 80 on one side thereof which receives a complementary boss 82 of a flat pivot member 84. The pivot member 84 is held by a pair of screws 86 against a shoulder 88 recessed in the bottom surface 18 of the base 12. A flat side wall 90 of the boss 82 abuts a bottom surface 92 of the recess 80 to hold the key 78 against a bottom wall 96 of a base slot 94. The key 78 is free to pivot about the projection 82 and its angular position is controlled by a pair of set screws 98 which are threaded through the base 12 and into the slot 94. The screws abut the opposite ends of a wall 100 formed on the opposite side of the key 78 from the cylindrical recess 80. The screws 98 are located on opposite sides of a vertical plane extending longitudinally of the tool and intersecting the pivot axis of the key 78. By advancing one of the set screws 98 and retracting the other of said set screws the angular position of the key 78 may be adjusted. It occasionally happens that a cutting edge 102 of a particular tool 65 will have been ground so that it is not perfectly square to the work when the tool is mounted on the head 52. Such a tool is said to possess "taper." Under these circumstances, the base 12 must be angled slightly to compensate for or "take out" the taper. This can be accomplished very conveniently and accurately on the present tool holder by pivoting the key 78 about its pivot axis the requisite amount.

One of the significant advantages of the tool holder relates to a longitudinal adjustment. If the form tool 65 has to be reground, the deflectable wall 28 may be loosened, the adjusting screw 78 rotated to advance the carrier 48 by an amount sufficient to compensate for the metal removed from the tool 65, and the clamping screws 44 retightened to lock the carrier 48 in the new position. All of this may be done without disturbing the position of the base 12 on the machine slide. In other words, longitudinal adjustment of the tool 65 is possible without disturbing the basic longitudinal, transverse or angular positions of the base 12 on the machine slide.

The shape of the key 56 is such as to angularly position the carrier 48 in what may be called a "zero " tool relief or perpendicular position. In other words the cutting edge 102 of the cutting tool 65 will be in a plane parallel to the axis of rotation of the work. In many situations, however, the angular orientation of the tool 65 and its carrier 48 are desirably canted to provide a relief for the cutting edge. This ordinarily done when the nature of the work permits it in order to extend the life of the cutting edge 102. The design of the present tool permits the automatic achievement of a 2° relief angle in either direction by the use of an alternate key 104 (FIG. 6). The key 56 is simply removed from the key slot 54 and the key 104 is substituted for it. The key 104 has a pair of parallel side walls 106 and 108 which fit within the keyway 76 and are inclined 2° with respect to a radius through the center of the key slot 54. The side walls 106 and 108 are circumferentially displaced relative to the walls 57 of the key 56 and angularly offset the carrier 48 by 2° with respect to the carrier position when the key 56 is used. FIG. 6 shows the key 104 installed in the slot 54 in one of two possible positions. By reversing the key 104 the carrier shank 50 will be offset 2° in the opposite direction.

The tool holder is illustrated in the drawings with the tool carrier 48 in an "upcutting" position. In other words, the tool 65 is positioned with its cutting edge 102 facing upwardly. The carrier 48 may also be set for "downcutting " by rotating the carrier 180°. When this is done, the key 56 or 104 is removed from the key slot 54 and inserted in the key slot 55. It will be noted that no special fastenings or the like are required to hold the key 56 or 104 in the selected key slot as the key is kept from coming out of the selected key slot by its fit in the keyway 76. Whether the carrier 48 is set for either "upcutting" or "downcutting" will depend upon the direction of rotation of the work relative to the slide on which the tool holder is mounted, as will be apparent to anyone familiar with automatic screw machines.

What is claimed is:

1. A tool holder including a base having a mounting surface adapted to be positioned on the slide of a machine tool, said base having a guide opening extending the length thereof and a slot extending between one side of said guide opening and a side wall of said base, said slot extending the entire length of said guide opening and defining the free end of a deflectable wall of said base, a tool carrier having a tool at one end thereof and a shank portion slidably disposed within said guide opening, an adjusting screw threaded into said shank portion for adjusting said shank longitudinally in said guide opening, clamping screw means engageable with the free end of said deflectable wall and threaded into said base for clamping said deflectable wall against said shank portion and a plurality of mounting bolts extending through said base on opposite sides of said guide opening.

2. The structure set forth in claim 1 wherein the mounting bolts on one side of said base are positioned beneath said slot and the free end of said deflectable wall has opening means providing access to the mounting bolts on said one side of said guide opening for the insertion, removal and tightening thereof.

3. The structure set forth in claim 1 including interfitting key and keyway means on said base and said shank portion whereby said shank portion is permitted to move longitudinally within said guide opening but is restrained from rotating therein.

4. The structure set forth in claim 1 including a micrometer adjusting screw mounted on said base and threadably engageable with said carrier for adjusting said carrier longitudinally of said guide opening.

5. The structure set forth in claim 1 including a key projecting from said mounting surface and means for adjusting said key about an axis normal to said mounting surface.

6. The structure set forth in claim 1 including a keyway formed along one side of said guide opening, a pair of key slots positioned on diametrically opposite sides of said shank portion, and a key slidable in said keyway, said key being selectively fitted in one of said key slots.

7. The structure set forth in claim 1 including a keyway on one of said base and shank portion and a key slot on the other of said base and said shank portion, a pair of alternately usable keys adapted to be fitted in said key slot and slidably fit in said keyway, one of said keys being operable to angularly displace said shank portion with respect to its angular position in said guide opening when the other of said keys is used.

6. The structure set forth in claim 1 including a keyway formed along one side of said guide opoening, a pair of key slots positioned on diametrically opposite sides of said shank portion, and a key slidable in said keyway, said key being selectively fitted in one of said key slots.

7. The structure set forth in claim 1 including a keyway on one of said base and shank portion and a key slot on the other of said base and said shank portion, a pair of alternately usable keys adapted to be fitted in said key slot and slidably fit in said keyway, one of said keys being operable to angularly displace said shank portion with respect to its angular position in said guide opening when in other of said keys is used.

* * * * *